US012544298B1

(12) United States Patent
DiPeri et al.

(10) Patent No.: US 12,544,298 B1
(45) Date of Patent: Feb. 10, 2026

(54) SLING FOR MASSAGE BALL

(71) Applicant: MyoStorm, LLC, Springville, UT (US)

(72) Inventors: Jonathan D. DiPeri, Springville, UT (US); Bailey Carlson, Springville, UT (US)

(73) Assignee: MyoStorm, LLC, Springville, UT (US)

( * ) Notice: Subject to any disclaimer, the term of this patent is extended or adjusted under 35 U.S.C. 154(b) by 907 days.

(21) Appl. No.: 17/840,545

(22) Filed: Jun. 14, 2022

Related U.S. Application Data

(60) Provisional application No. 63/210,468, filed on Jun. 14, 2021.

(51) Int. Cl.
*A61H 15/00* (2006.01)
*A61H 23/02* (2006.01)

(52) U.S. Cl.
CPC ..... *A61H 15/0078* (2013.01); *A61H 23/0263* (2013.01); *A61H 2015/0042* (2013.01); *A61H 2015/0071* (2013.01); *A61H 2201/0119* (2013.01); *A61H 2201/0207* (2013.01); *A61H 2201/1253* (2013.01)

(58) Field of Classification Search
CPC ................ A61H 15/00; A61H 15/0078; A61H 15/0085; A61H 15/0092; A61H 15/02; A61H 2015/0042; A61H 2015/0064; A61H 2015/0071; A61H 2201/0119; A61H 2201/0153; A61H 2201/0207; A61H 2201/1253; A63B 21/068; A63B 21/04; A63B 21/0414; A63B 21/0442; A63B 21/0608; A63B 47/00; A63B 47/001; A63B 47/007
USPC .................. 224/148.6, 919, 610; 206/315.9; D3/229, 257
See application file for complete search history.

(56) References Cited

U.S. PATENT DOCUMENTS 2,028,865 A * 1/1936 Forsyth .............. A61H 15/0092 601/143
2,293,562 A * 8/1942 Rosenthal .............. A44B 11/04 24/200
4,396,136 A * 8/1983 Stafford, Jr. ......... A63B 47/001 224/663
4,836,427 A * 6/1989 McManus ................. A45F 5/00 224/663
5,545,456 A * 8/1996 Suida ..................... A47K 7/022 428/76
6,007,501 A * 12/1999 Cabados ................ A61H 39/04 601/134
11,096,860 B2 8/2021 DiPeri et al.
(Continued)

OTHER PUBLICATIONS

SKLZ AccuStrap Pressure Point Massage Ball with Strap, https://youtu.be/BsitRtz0RsI, 2 pages, Oct. 29, 2014.
(Continued)

*Primary Examiner* — Colin W Stuart
*Assistant Examiner* — Douglas Y Sul
(74) *Attorney, Agent, or Firm* — Young Basile Hanlon & MacFarlane, P.C.

(57) ABSTRACT

A method for self-administering physical therapy is disclosed. The method may comprise inserting a massage element (e.g., a massage ball) into a receiving space of a sling. Thereafter, the user may use the sling to position the massage element adjacent to a portion of a body (e.g., a dorsal or distal portion of the user's body) that would be difficult to reach or access without the use of the sling.

16 Claims, 5 Drawing Sheets

(56) References Cited

U.S. PATENT DOCUMENTS

| | | | | |
|---|---|---|---|---|
| 2003/0176264 | A1* | 9/2003 | Burns | A61H 11/00<br>482/148 |
| 2005/0085350 | A1* | 4/2005 | Shen | A63B 23/00<br>482/91 |
| 2009/0069729 | A1* | 3/2009 | Burns | A61H 11/00<br>601/134 |
| 2012/0253248 | A1* | 10/2012 | Carlson | A61H 15/00<br>601/128 |
| 2013/0085426 | A1* | 4/2013 | Brodsky | A61N 5/0619<br>601/128 |
| 2014/0276280 | A1* | 9/2014 | Oller, Jr. | A61H 7/003<br>601/138 |
| 2015/0272774 | A1* | 10/2015 | Lee | A61H 23/0263<br>601/15 |
| 2017/0106249 | A1* | 4/2017 | Marton | A63B 21/00178 |
| 2017/0196765 | A1* | 7/2017 | Hagaman | B29C 41/20 |
| 2018/0055723 | A1* | 3/2018 | Bick | A61H 15/0092 |
| 2019/0000711 | A1* | 1/2019 | Pundyk | A61H 15/00 |
| 2020/0016026 | A1* | 1/2020 | Depta | A61H 1/00 |
| 2022/0040031 | A1* | 2/2022 | Huang | A61H 15/0078 |

OTHER PUBLICATIONS

Tiger Tail USA Tiger Ball Massage On A Rope HD LuxFit, https://youtu.be/7OfcthVZYz4, 4 pages, Nov. 2, 2016.

Yoga Strap Stretches—Upper & Lower Body Stretching, https://youtu.be/EeUHKu4OfSk, 2 pages, Mar. 18, 2020.

Introducing Our New TB12 Vibrating Pliability Mini Sphere, https://youtu.be/kliCHBOsh3I, 6 pages, Jul. 20, 2020.

* cited by examiner

SLING FOR MASSAGE BALL

CROSS-REFERENCE TO RELATED APPLICATION(S)

This application claims priority to and the benefit of U.S. Provisional Patent Application Ser. No. 63/210,468, filed Jun. 14, 2021, the entire disclosure of which is hereby incorporated by reference.

TECHNICAL FIELD

This disclosure relates to physical therapy and, more particularly, to novel systems and methods for facilitating self-delivered physical therapy

BACKGROUND

Massage balls are devices that facilitate self-delivered physical therapy. What is needed are improved devices that enable massage balls to be used in more or more effective ways.

SUMMARY

Disclosed herein are implementations of a method for self-administering physical therapy. The method may comprise inserting a massage element (e.g., a vibrating massage ball) into a receiving space of a sling. Thereafter, the user may use the sling to position the massage element adjacent to a portion of a body (e.g., a dorsal or distal portion of the user's body).

The sling may include a pouch, two straps, and two clips. The pouch may be sized and shaped to hold the massage element therewithin. For example, the pouch may include a bowl, a support strap, and edging. The bowl may comprise a mesh material, fabric, or the like that is formed into a bowl or hemispherical shape. The support strap may extend from one side of a bowl, underneath the bowl, to an opposite side of the bowl. Opposite ends of the support strap may have respective loops formed therein for receiving respective clips. Edging may extend around and protect or bind an upper lip or rim of the bowl.

The clip may form a mechanical interface between a strap and a loop in a respective end of the support strap. Accordingly, when the massage element is placed within the pouch and the clips and corresponding straps are connected to each end of the support strap, a user may use the resulting sling to hold the massage element against parts of his or her body that would otherwise be difficult to reach. For example, the user may use the sling to hold the massage element against his or her back, the back of his or her neck, or the like. Alternatively, or in addition thereto, the user may use the sling and massaging element in certain stretching exercises.

BRIEF DESCRIPTION OF THE DRAWINGS

The disclosure is best understood from the following detailed description when read in conjunction with the accompanying drawings. It is emphasized that, according to common practice, the various features of the drawings may not be to-scale. On the contrary, the dimensions of the various features may be arbitrarily expanded or reduced for clarity.

DETAILED DESCRIPTION

Figure 1:
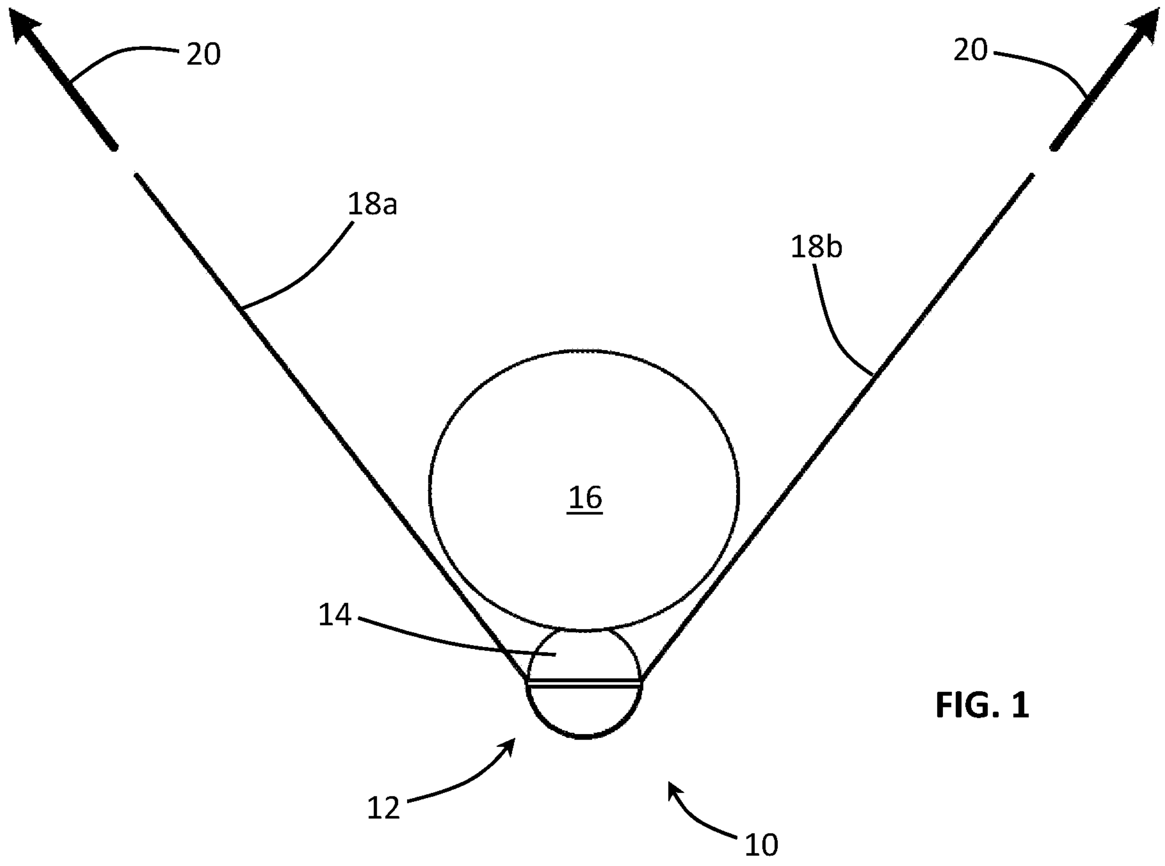
FIG. 1 is a schematic diagram illustrating use of a sling to hold a massage element against a portion of a body.
Figure 2:
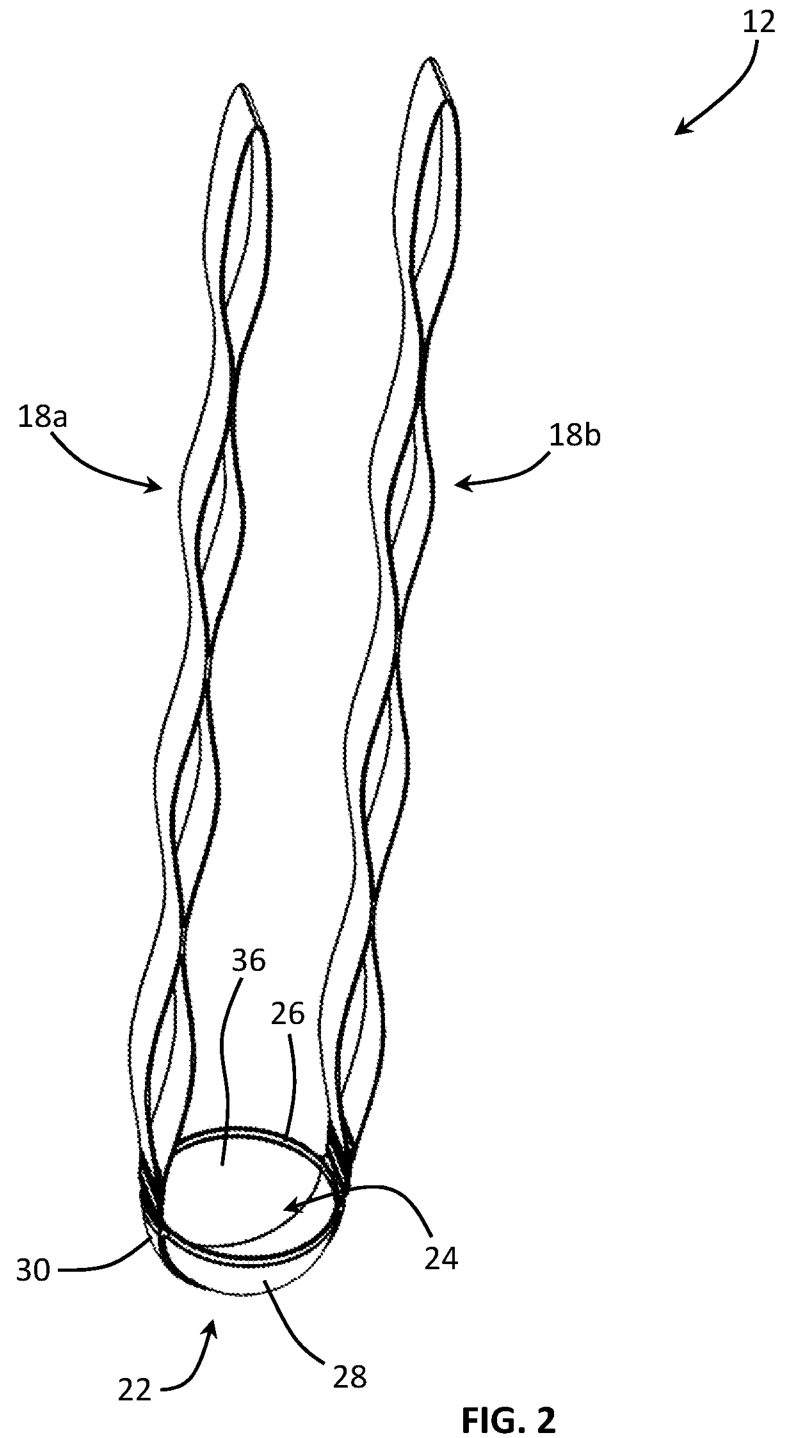
FIG. 2 is a perspective view of a sling in accordance with the present invention.
Figure 3:
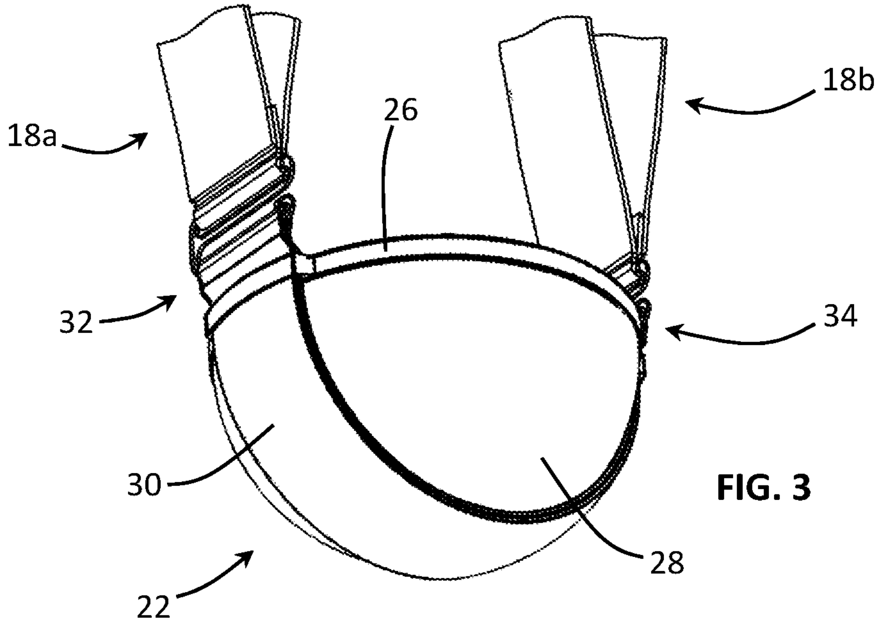
FIG. 3 is a partial perspective view of the sling of FIG. 2.
Figure 4:
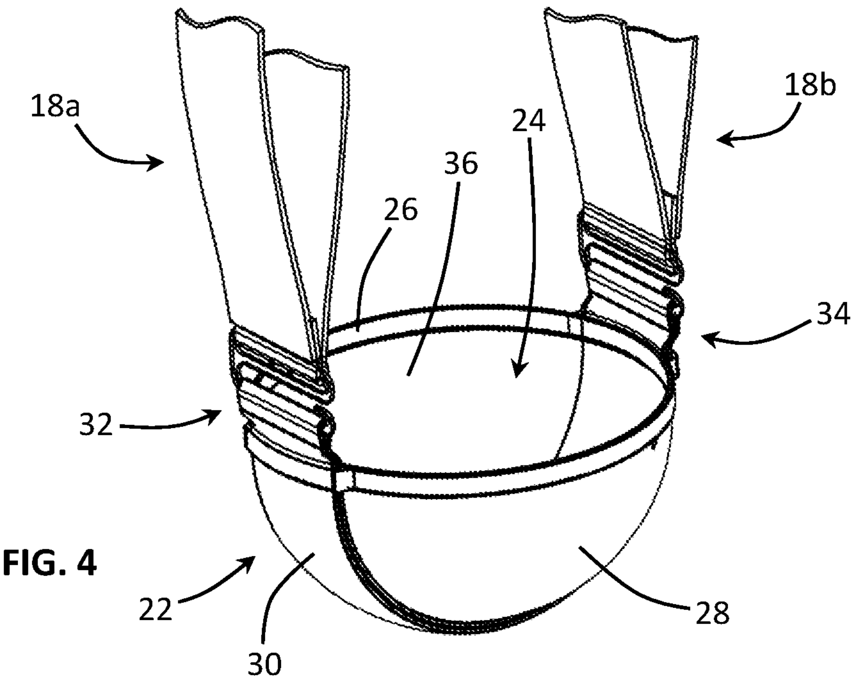
FIG. 4 is another partial perspective view of the sling of FIG. 2.
Figure 5:
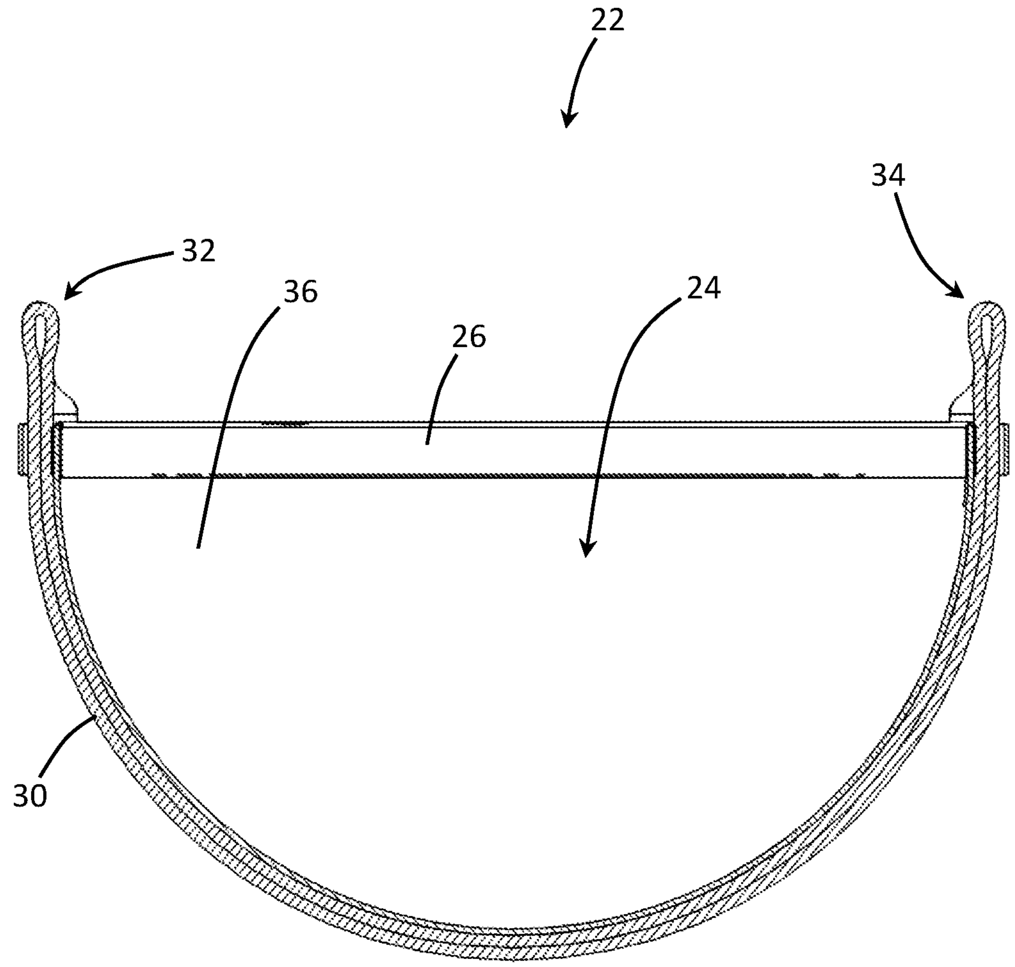
FIG. 5 is a cross-sectional view of a portion of the sling of FIG. 2.

Referring to FIG. 1, a system 10 in accordance with the present invention may include a sling 12 and a massage element 14. The sling 12 may be used to hold the massage element 14 against a portion 16 of a body (e.g., a portion 16 of the body of a user, some other person, or an animal) that would otherwise be difficult to reach. For example, a user may use the sling 12 to hold a massage element 14 against his or her back, the back of his or her neck, or the like. Alternatively, or in addition thereto, a user may use the sling 12 and massage element 14 in certain stretching exercises.

In certain embodiments, a method for massaging a portion 16 of a body may comprise connecting a massage element 14 (e.g., a massage ball or massage implement that is spherical in shape) to a first strap **18*a* and second strap 18*b* of the sling 12. Thereafter the first strap 18*a* and the second strap 18*a* may be used to position the massage element 14 in contact with the portion 16 (e.g., a dorsal or distal portion) of the body. Pulling (e.g., applying one or more forces 20) on the first strap 18*a* and the second strap 18*b* may press or urge the massage element 14 against the portion 16 of the body. Additionally, manipulating (e.g., after or during the pulling) the first strap 18*a* and the second strap 18*b* may move the massage element 14 along, across, or over the portion 16** of the body (e.g., may position the massage element adjacent to a portion of the body).

In selected embodiments, the method for massaging the portion 16 of the body may include providing a first input to (e.g., actuating a first switch or first button on) the massage element 14. In response to the first input, the massage element 14 may generate heat that may improve the therapeutic effect of the massaging. Alternatively, or in addition thereto, the method may include providing a second input to (e.g., actuating a second switch or second button on) the massage element 14. In response to the second input, the massage element 14 may generate vibration that may improve the therapeutic effect of the massaging.

A massage element 14 may have any suitable configuration or size. For example, in certain embodiments, a massage element 14 may be a massage ball as disclosed in U.S. Pat. No. 11,096,860 issued Aug. 24, 2021, which is hereby incorporated by reference. Accordingly, a massage element 14 may selectively provide vibration and/or heat to enhance the therapeutic effect thereof. That is, in selected embodiments, the massage element 14 may comprise a motor, a shaft operatively connected to the motor, and a weight asymmetrically or eccentrically affixed to the shaft (e.g., an eccentric weight fixedly connected to the shaft or asymmetrically secured to the shaft). The motor may selectively rotate the shaft to generate the vibration in response to the second input (e.g., an input to trigger the motor).

In certain embodiments, the connecting the massage element 14 to the first strap **18*a* and the second strap 18*b* may comprise inserting the massage element 14 into a pouch 22 that forms part of the sling 12. The pouch 22 may be connected to the first strap 18***a* and the second strap 18*b*. The pouch 22 may comprise, define, or form a hemisphere (e.g., the pouch may be hemispherical in shape). The pouch 22 or a hemisphere corresponding thereto may define a receiving space 24 into which the massage element 14 may be inserted.

Referring to FIGS. 2-5, in selected embodiments, the pouch 22 may comprise a rim 26 and an outer surface 28. The pouch 22 may further comprise an elongated support 30 comprising a first end 32 and a second end 34 opposite the first end 32. The elongated support 30 may extend across the outer surface 28 of the pouch 22 so as to bisect the outer surface 28 (e.g., bisect a hemisphere defined by the pouch 22). The first end 32 of the elongated support 30 may comprise a first loop. The second end 34 of the elongated support 30 may comprise a second loop. The first strap 18*a* may engage the first loop. The second strap 18*b* may engage the second loop. Accordingly, the elongated support 30 may be sized and configured (e.g., formed of a material such as NYLON webbing or the like) to carry, resolve, or transfer the forces 20 imposed by the first strap 18*a* and the second strap 18*b* onto the pouch 22.

In certain embodiments, a system 10 in accordance with the present invention may be a physical therapy apparatus and comprise a pouch 22 formed from a flexible material. For example, the pouch 22 may comprise a hemisphere formed of a mesh material, fabric, or the like. The pouch 22 may comprise an inner surface 36, an outer surface 28, and an edge or rim 26. The inner surface 36 and the rim 26 may define the receiving space 24. The elongated support 30 may extend along the outer surface 28 of the hemisphere from a first portion of the rim 26 to a second portion of the rim 26 opposite the first portion of the rim 26. Thus, the elongated support 30 (and not the mesh material, fabric, or the like forming the hemisphere) may carry most of the loads or forces 20 applied to the pouch 22.

In selected embodiments, a diameter of the pouch 22 or the hemisphere defined thereby may be between about 3 inches and about 4 inches and a diameter of the massage element 14 (e.g., of a spherical massage implement) may also be between about 3 inches and about 4 inches. In other embodiments, a diameter of the pouch 22 or the hemisphere defined thereby may be between about 4 inches and about 5 inches and a diameter of the massage element 14 may also be between about 4 inches and about 5 inches.

Figure 6:
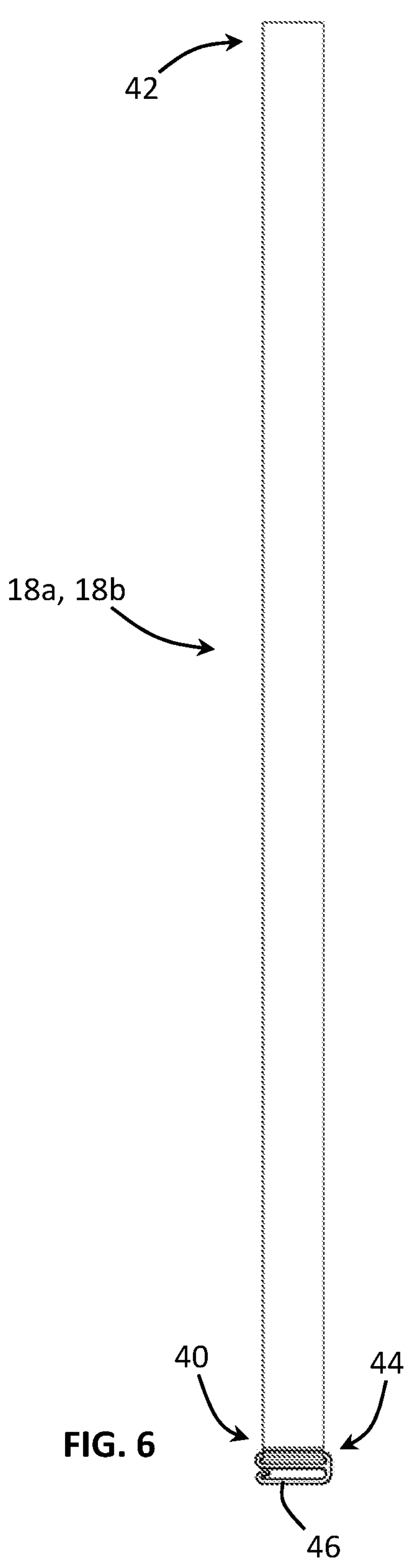
FIG. 6 is a side view of a strap of the sling of FIG. 2.
Figure 7:
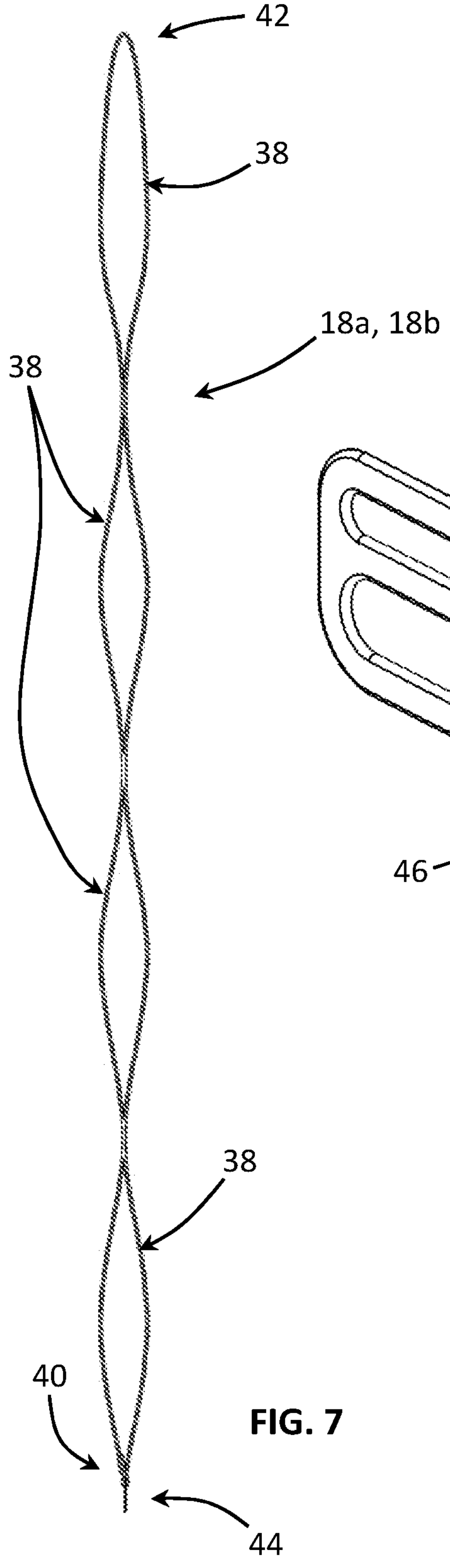
FIG. 7 is a front view of the strap of FIG. 6.
Figure 8:
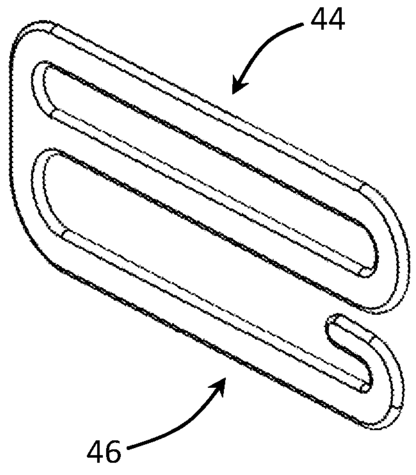
FIG. 8 is a perspective view of a clip or engagement mechanism of the strap of FIG. 6.

Referring to FIGS. 6-8, in certain embodiments, the first strap 18*a* and the second strap 18*b* may each have a plurality of loops 38 formed therein. Such loops 38 may make it easier for a user to engage or grip the first strap 18*a* and/or the second strap 18*b* at different locations along a length thereof when applying forces 20 (e.g., tensile forces) thereto.

Each of the first strap 18*a* and the second strap 18*b* may comprise a first end 40, a second end 42 opposite the first end 40, and an engagement mechanism 44 located at the first end 40. The engagement mechanism 44 of the first strap 18*a* may be connected to a first portion of the pouch 22 and the engagement mechanism 44 of the second strap 18*a* may be connected to a second portion of the pouch 22. For example, in selected embodiments, the first portion of the pouch 22 may comprise a first loop (e.g., a loop formed at the first end 32 of the elongated support 30). The second portion of the pouch 22 may comprise a second loop (e.g., a loop formed at the second end 34 of the elongated support 30). The engagement mechanism 44 of the first strap 18*a* may be or comprise a hook 46 that engages the first loop. Similarly, the engagement mechanism 44 of the second strap 18*b* may be a hook 46 that engages the second loop. In other embodiments, other kinds of engagement mechanisms 44 or fasteners (e.g., buckles, side-release buckles, or the like) may be positioned at the first end 40 of the first strap 18*a* and of the second strap 18*b* to engage or connect to the pouch 22.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method comprising:

inserting a massage element into a receiving space of a sling, wherein:

the sling comprises a pouch, a first strap, a second strap, and an elongated support, the pouch comprises an inner surface, an outer surface, and a rim, the inner surface and the rim defining the receiving space, the elongated support comprises a first end, a second end opposite the first end, a first loop located at the first end, and a second loop located at the second end, wherein the elongated support extends along the outer surface from a first portion of the rim to a second portion of the rim opposite the first portion of the rim;

the first strap is connected to the first loop;

the second strap is connected to the second loop, and the massage element comprises a motor that generates a vibration in response to an input;

providing the input to trigger the motor to generate the vibration; and positioning the massage element adjacent to a portion of a body.

2. The method of claim 1, wherein:

the motor of the massage element further comprises a shaft and an eccentric weight fixedly connected to the shaft; and the motor generates the vibration by rotating the shaft.

3. The method of claim 1, wherein the positioning comprises pulling the first strap and the second strap to press the massage element against the portion of the body.

4. The method of claim 3, further comprising manipulating, after the pulling, the first strap and the second strap to move the massage element along the portion of the body.

5. The method of claim 1, wherein:

the massage element is spherical in shape; and the pouch is hemispherical in shape.

6. The method of claim 1, wherein the pouch comprises a mesh material.

7. The method of claim 1, wherein:

each of the first strap and the second strap comprise a first end, a second end opposite the first end, and an engagement mechanism located at the first end; and the engagement mechanism of the first strap is connected to the first loop and the engagement mechanism of the second strap is connected to the second.

8. The method of claim 7, wherein:

the engagement mechanism of the first strap is a hook that engages the first loop; and the engagement mechanism of the second strap is a hook that engages the second loop.

9. The method of claim 1, wherein:

the positioning comprises pulling the first strap and the second strap to press the massage element against the portion of the body; and the portion of the body is a dorsal portion of the body.

10. A method comprising:

connecting a massage element to a first strap and a second strap by inserting the massage element into a pouch that is connected to the first strap and the second strap, wherein the pouch comprises a rim, an outer surface, and an elongated support, the elongated support comprises a first end and a second end opposite the first end and extends across the outer surface of the pouch to bisect the outer surface of the pouch, the first end of the elongated support comprises a first loop, the second end of the elongated support comprises a second loop, the first strap engages the first loop, and the second strap engages the second loop;

providing a first input to the massage element;

generating, by the massage element, heat in response to the first input;

positioning the massage element in contact with a portion of a body;

pulling on the first strap and the second strap to press the massage element against the portion of the body; and manipulating, after the pulling, the first strap and the second strap to move the massage element along the portion of the body.

11. The method of claim 10, further comprising:

providing a second input to the massage element; and generating, by the massage element, vibration in response to the second input.

12. The method of claim 11, wherein:

the massage element comprises a motor, a shaft operatively connected to the motor, and a weight asymmetrically affixed to the shaft; and the motor selectively rotates the shaft to generate the vibration in response to the second input.

13. The method of claim 10, wherein:

the massage element is spherical in shape;

the pouch comprises a hemisphere; and the hemisphere defines a receiving space into which the massage element is inserted.

14. An apparatus comprising:

a pouch formed from a flexible material, the pouch comprising an inner surface, an outer surface, and an edge, wherein the inner surface and the edge define a receiving space;

an elongated support comprising a first end, a second end opposite the first end, a first loop located at the first end, and a second loop located at the second end, wherein the elongated support extends along the outer surface from a first portion of the edge to a second portion of the edge opposite the first portion of the edge;

a first strap engaging the first loop of the elongated support;

a second strap engaging the second loop of the elongated support; and a spherical massage implement positioned within the receiving space, the spherical massage implement comprising a motor, a shaft operatively connected to the motor, and a weight asymmetrically secured to the shaft, wherein the motor selectively rotates the shaft to generate a vibration.

15. The apparatus of claim 14, wherein:

a diameter of the pouch is between about 3 inches and about 4 inches; and a diameter of the spherical massage implement is between about 3 inches and about 4 inches.

16. The apparatus of claim 14, wherein:

a diameter of the pouch is between about 4 inches and about 5 inches; and a diameter of the spherical massage implement is between about 4 inches and about 5 inches.

* * * * *